US010629056B1

(12) United States Patent
Forest

(10) Patent No.: US 10,629,056 B1
(45) Date of Patent: Apr. 21, 2020

(54) ALERT SYSTEM FOR A CHILD'S CAR SEAT

(71) Applicant: Lorraine T. Forest, Jeffersonville, IN (US)

(72) Inventor: Lorraine T. Forest, Jeffersonville, IN (US)

( * ) Notice: Subject to any disclaimer, the term of this patent is extended or adjusted under 35 U.S.C. 154(b) by 0 days.

(21) Appl. No.: 16/530,816

(22) Filed: Aug. 2, 2019

(51) Int. Cl.
| B60Q 1/00 | (2006.01) |
| G08B 21/22 | (2006.01) |
| G08B 21/24 | (2006.01) |
| G08B 21/02 | (2006.01) |
| B60N 2/00 | (2006.01) |

(52) U.S. Cl.
CPC ......... *G08B 21/22* (2013.01); *G08B 21/0252* (2013.01); *G08B 21/0283* (2013.01); *G08B 21/24* (2013.01); *B60N 2/002* (2013.01)

(58) Field of Classification Search
CPC .... G08B 21/22; G08B 21/0252; G08B 21/24; G08B 21/0283; G08B 21/0266; B60N 2/002; B60N 2002/2815; H04B 1/3816; H04W 4/48; H04W 4/80; H04W 4/14; B60K 28/066
USPC ....... 340/457, 573.1, 573.4, 425.5, 522, 667
See application file for complete search history.

(56) References Cited

U.S. PATENT DOCUMENTS

| 9,741,224 B1* | 8/2017 | Singh | H04W 4/14 |
| 10,115,282 B1* | 10/2018 | Merrill | G08B 21/0205 |
| 2014/0253314 A1* | 9/2014 | Rambadt | B60N 2/002 |
| | | | 340/457.1 |
| 2019/0161057 A1* | 5/2019 | Alderman | G01S 19/17 |
| 2019/0215672 A1* | 7/2019 | Orris | H04W 4/80 |

* cited by examiner

*Primary Examiner* — Anh V La
(74) *Attorney, Agent, or Firm* — QuickPatents, LLC; Kevin Prince

(57) ABSTRACT

An alert system for sending an alert through a network when a child is abandoned in a vehicle includes a control circuit having a controller, a battery, a battery recharging circuit, a location sensing circuit, a network communication circuit, a weight sensor, and a memory. The weight sensor is disposed below the child when the child is seated in the car seat. The controller is adapted to determine if the child is occupying the car seat based on data from the weight sensor. If the child remains in the car seat beyond a first predetermined time after the controller senses that an ignition system of the vehicle has been turned off, the controller then records into the memory a current location and sends at least one message through the network with the network communication circuit, so as to alert a parent or emergency services.

20 Claims, 8 Drawing Sheets

ALERT SYSTEM FOR A CHILD'S CAR SEAT

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to child safety seats, and more particularly to a child safety seat having a phone alert function.

BACKGROUND

A child's death from heatstroke as a result of being inadvertently left in a vehicle is something no parent wants to face. Yet every year in the United States someone, without malice or ill intent, will forget about their small, usually sleeping child in a parking lot or driveway.

Therefore, there is a need for a device that can sense when a child has been left in a vehicle car seat with the vehicle turned off for more than a predetermined period of time, such as sixty seconds. Such a needed invention would alert the parent first, via SMS text or otherwise, and alert more people as necessary if the child has not been removed from the vehicle. Such a needed device would be easy to install in a car seat, and easy to set-up with a mobile phone, laptop computer, or other electronic device. The present invention accomplishes these objectives.

SUMMARY OF THE INVENTION

The present device is an alert system for sending an alert through a network when a child is abandoned in a car seat fixed with a vehicle of the type having an electronic ignition system that has an on state and an off state. In some embodiments the alert system is adapted to monitor two or more car seats in the vehicle.

A control circuit includes a controller, a battery, a battery recharging circuit, a location sensing circuit, a network communication circuit, a weight sensor, and a memory. The battery recharging circuit is adapted to connect with the vehicle ignition system for power and for detecting the on/off state of the ignition system. The battery is adapted for recharging by the recharging circuit when the vehicle ignition system is in the on state.

The memory is adapted to retain at least a location in the form of location coordinates from the location sensing circuit.

The weight sensor is disposed below the child when the child is seated in the car seat. The controller is adapted to determine if the child is occupying the car seat based on data from the weight sensor.

The control circuit is housed at least partially within an enclosure. The battery recharging circuit may include a cigarette lighter adapter or a 12 volt outlet for interfacing with the electronic ignition system of the vehicle through a 12 volt DC socket of the vehicle.

In use, if the child remains in the car seat beyond a first predetermined time, such as 60 seconds, after the controller senses with the battery recharging circuit that the ignition state of the ignition system has been set to the off state, the controller then records into the memory a current location, preferably in the form of geographic coordinates such as latitude and longitude, as reported by the location sensing circuit. The controller then sends at least one message through the network with the network communication circuit, so as to alert a parent or emergency services.

In some embodiments the control circuit further includes an interface circuit adapted to connect with an electronic device, such as a computer or mobile phone, for example. As such, the alert system allows the electronic device to act as an input device for vehicle identification information that is stored in the memory, such as a make, model and color of the vehicle as well as a license plate number of the vehicle. With such vehicle information included in the at least one message, emergency services personnel can quickly locate the correct vehicle nearest the location to take corrective action to free the child from the vehicle.

The present invention is a device that can sense when a child has been left in a vehicle car seat with the vehicle turned off for more than a predetermined period of time, such as sixty seconds. The present device alerts the parent or parents first, via SMS text or otherwise, and afterwards even more people, such as emergency services workers, as necessary if the child has not been removed from the vehicle after another predetermined time, such as another 60-180 seconds. The present invention is easy to install in a car seat, and easy to set-up with a mobile phone, laptop computer, or other electronic device. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
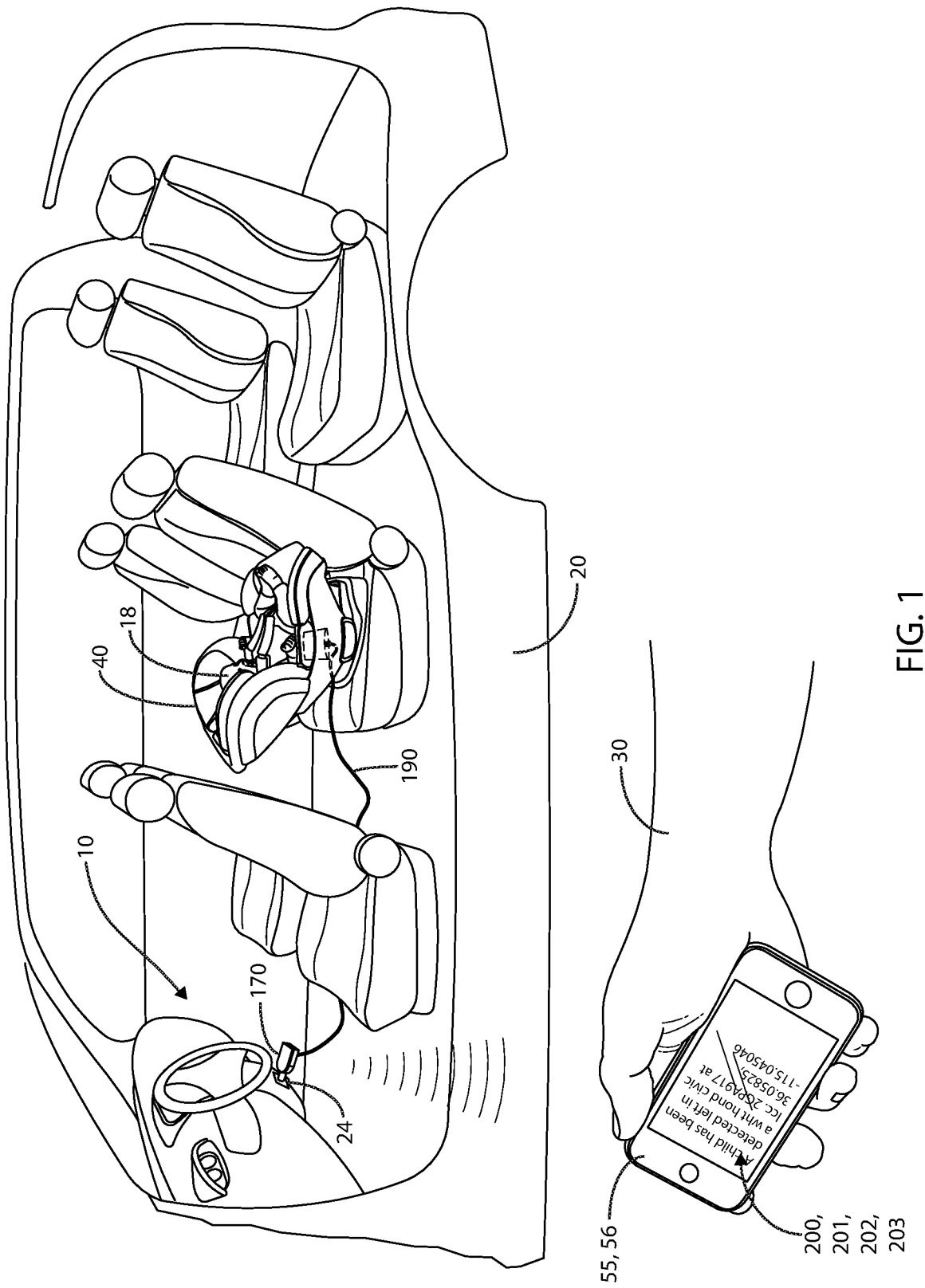
FIG. 1 is a diagram of the invention as used in a vehicle with a child in a car seat.
Figure 3:
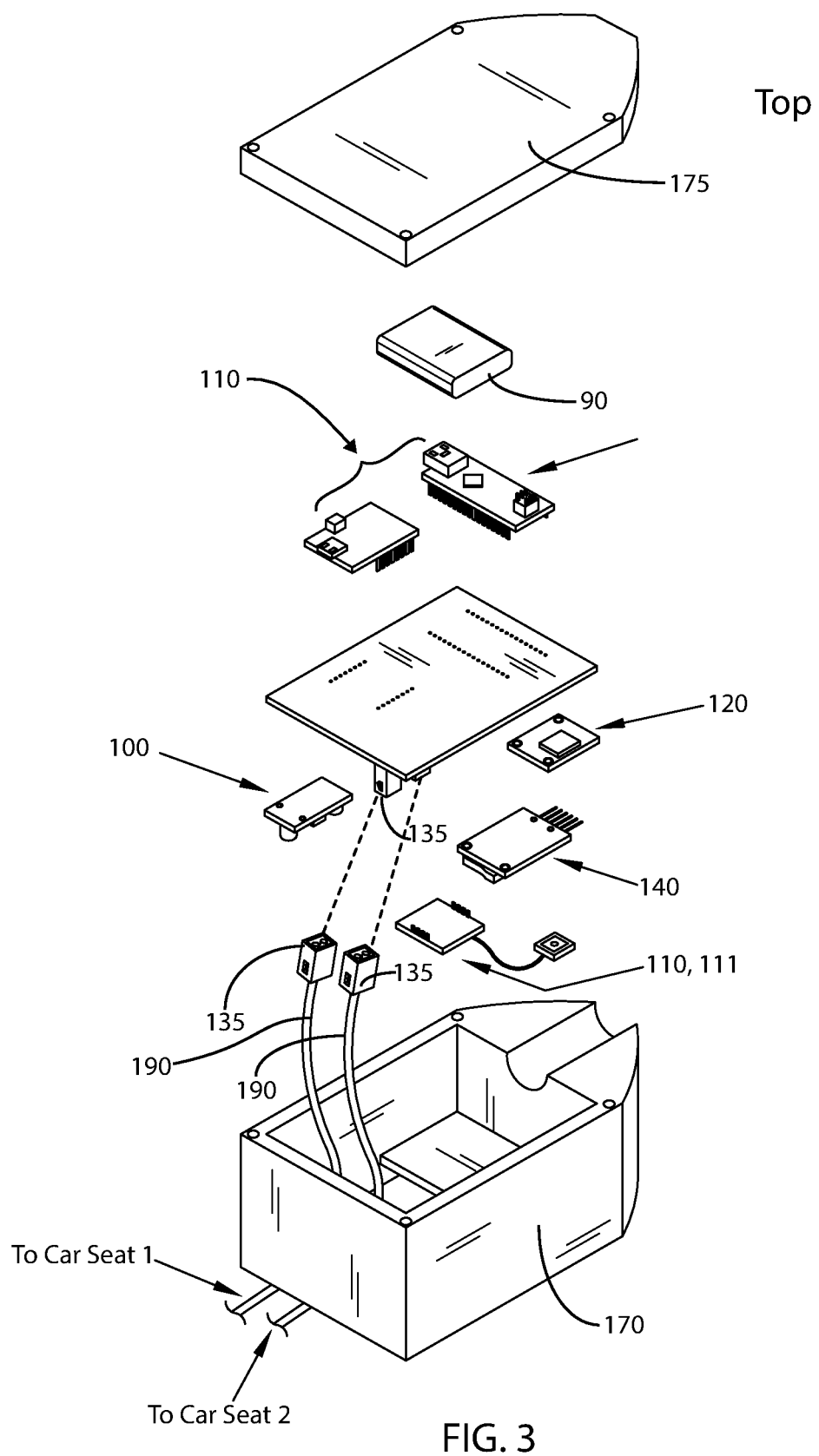
FIG. 3 is an exploded view of a control circuit and an enclosure of the invention.
Figure 4A:
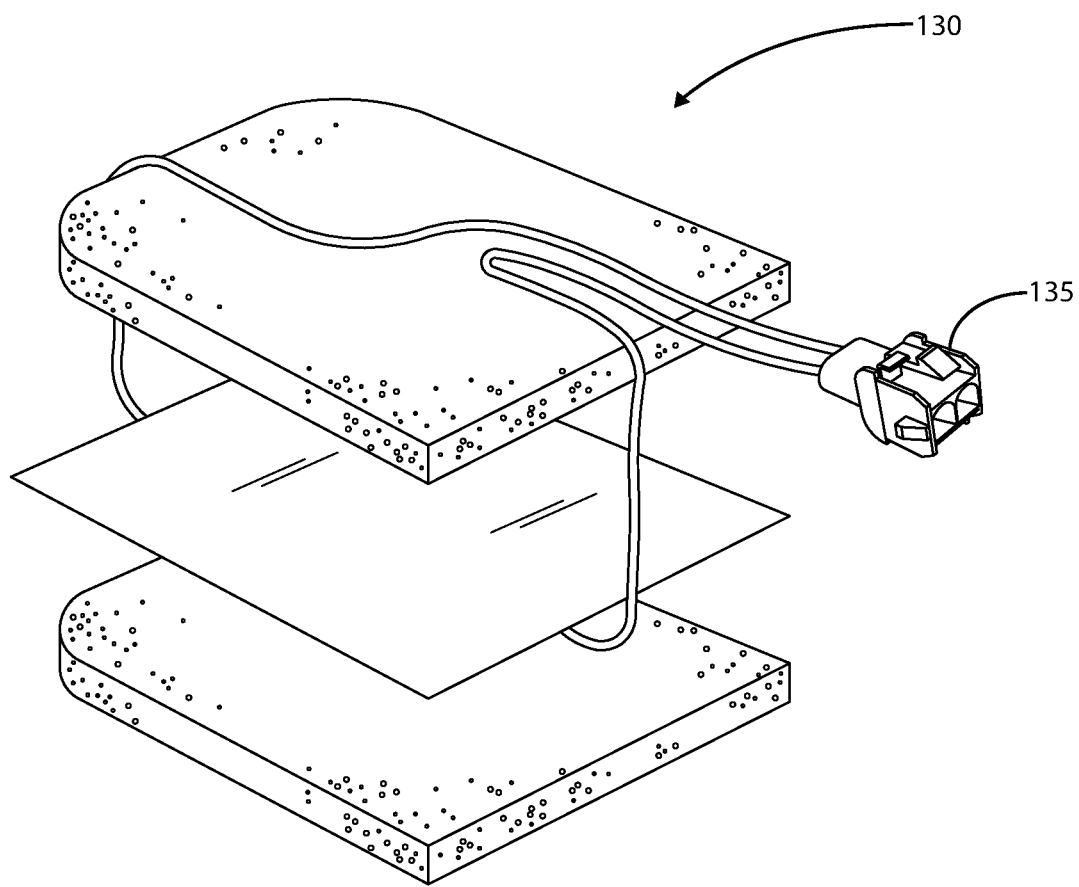
FIG. 4A is an exploded perspective view of the weight sensor.
Figure 4B:
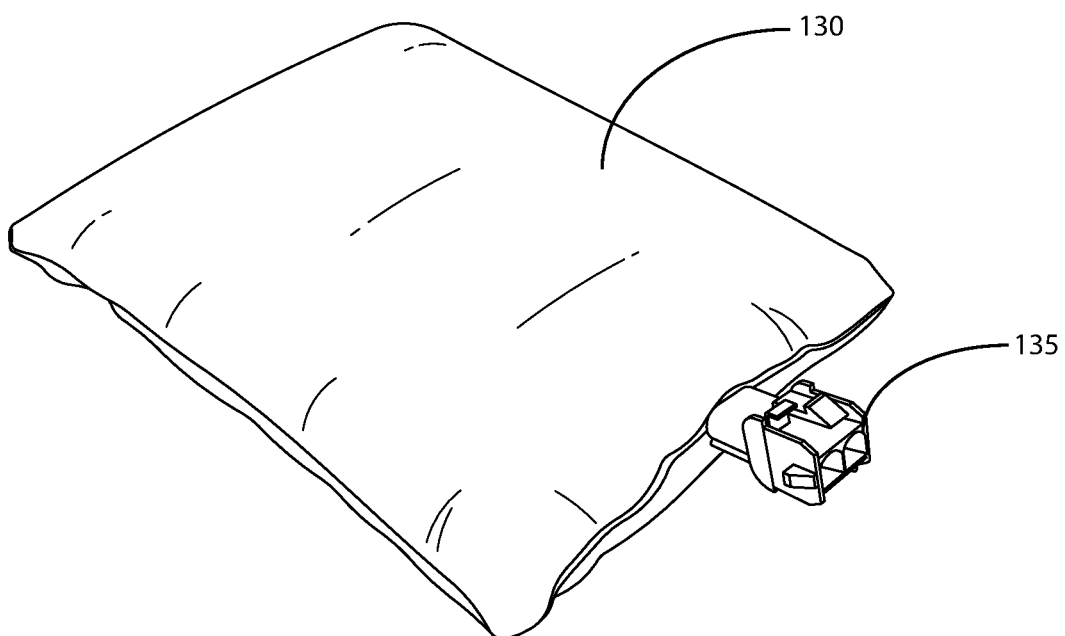
FIG. 4B is an enlarged perspective view of the weight sensor.

FIGS. 1 and 3 illustrate an alert system 10 for sending an alert through a network 15 when a child 18 is abandoned in a car seat 40 fixed with a vehicle 20 of the type having an electronic ignition system 21 that has an on state 22 and an off state 23. In some embodiments the alert system 10 is adapted to monitor two or more car seats 40 in the vehicle.

A control circuit 60 includes a controller 70, a battery 90, a battery recharging circuit 100, a location sensing circuit 110, such as a GPS location sensing circuit 111, a network communication circuit 120, a weight sensor 130, and a memory 140. Preferably the network communication circuit 120 includes an SMS network communication circuit 121, a GPRS network communication circuit 122, and/or a Bluetooth communication protocol 123 that is adapted for establishing a direct connection with a portable electronic device 55 owned, for example, by a parent 30 of the child 18 (FIG. 1). The portable electronic device 55 is of the type adapted to receive at least one message 200 from the control circuit 60. Alternately the portable electronic device 55 is of the type that can run software applications, with a software application being included to communicate with the control circuit via the Bluetooth communication protocol 123. Other communication protocols may come into use in the future, and the claims of the present application should not be construed to limit such to those protocols listed herein.

The battery recharging circuit 100 is adapted to connect with the vehicle ignition system 21 for power and for detecting the on/off state 22,23 of the ignition system 21. The battery 90 is adapted for recharging by the recharging circuit 100 when the vehicle ignition system 21 is in the on state 22. The memory 140, such as a SIM card or other flash-type memory, is adapted to retain at least a location 16 in the form of location coordinates from the location sensing circuit 110.

Figure 2:
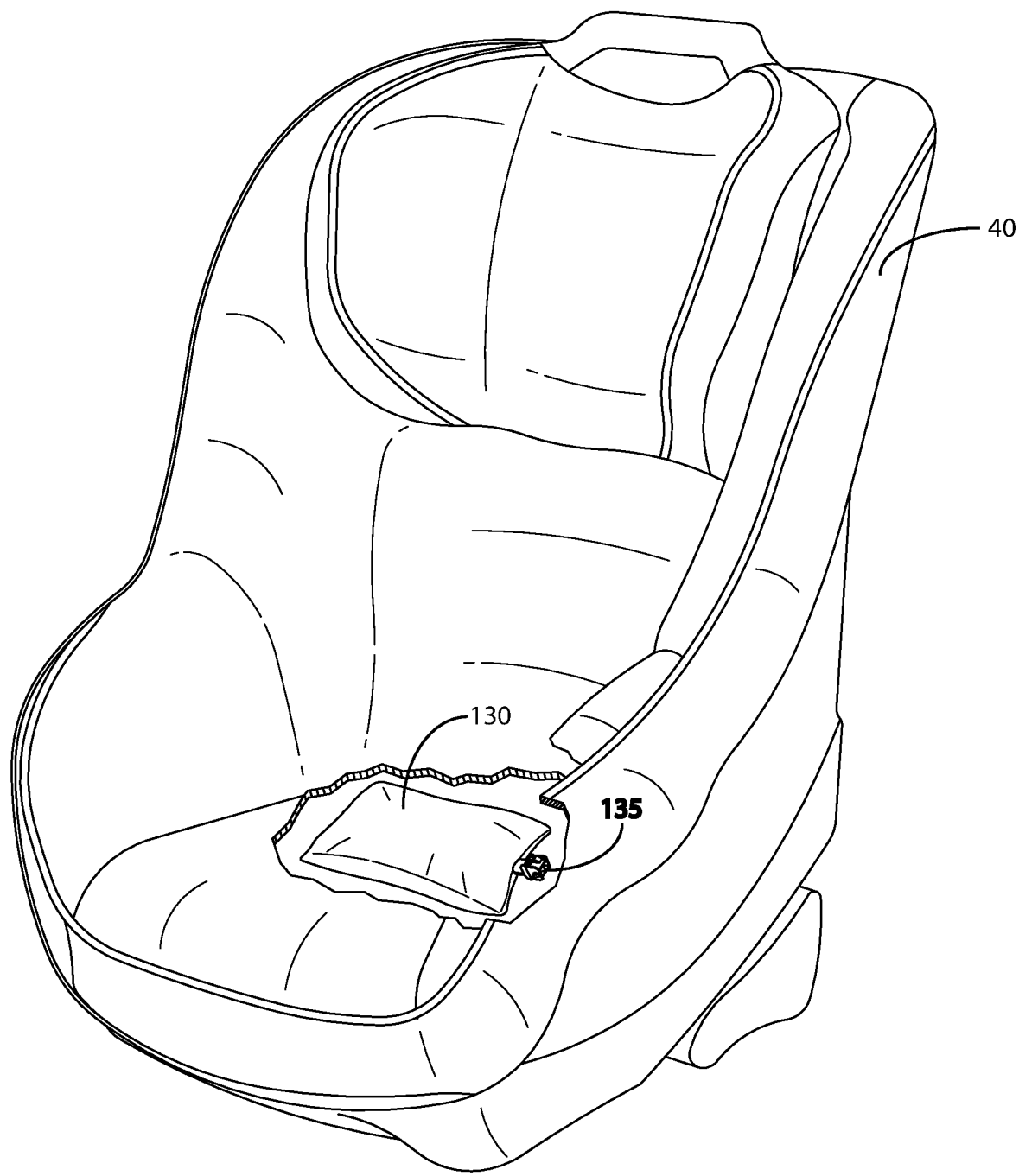
FIG. 2 is a perspective view of the car seat, partially broken away to reveal a weight sensor.

The weight sensor 130 is disposed below the child 18 when the child 18 is seated in the car seat 40 (FIG. 2, 4A, 4B). For example, the weight sensor 130 may be placed below a lower pad of the car seat 40 (FIG. 2) such that the weight of the child 18 will be detectable by the weight sensor 130. The controller 70 is adapted to determine if the child 18 is occupying the car seat 40 based on data from the weight sensor 130.

Figure 5:
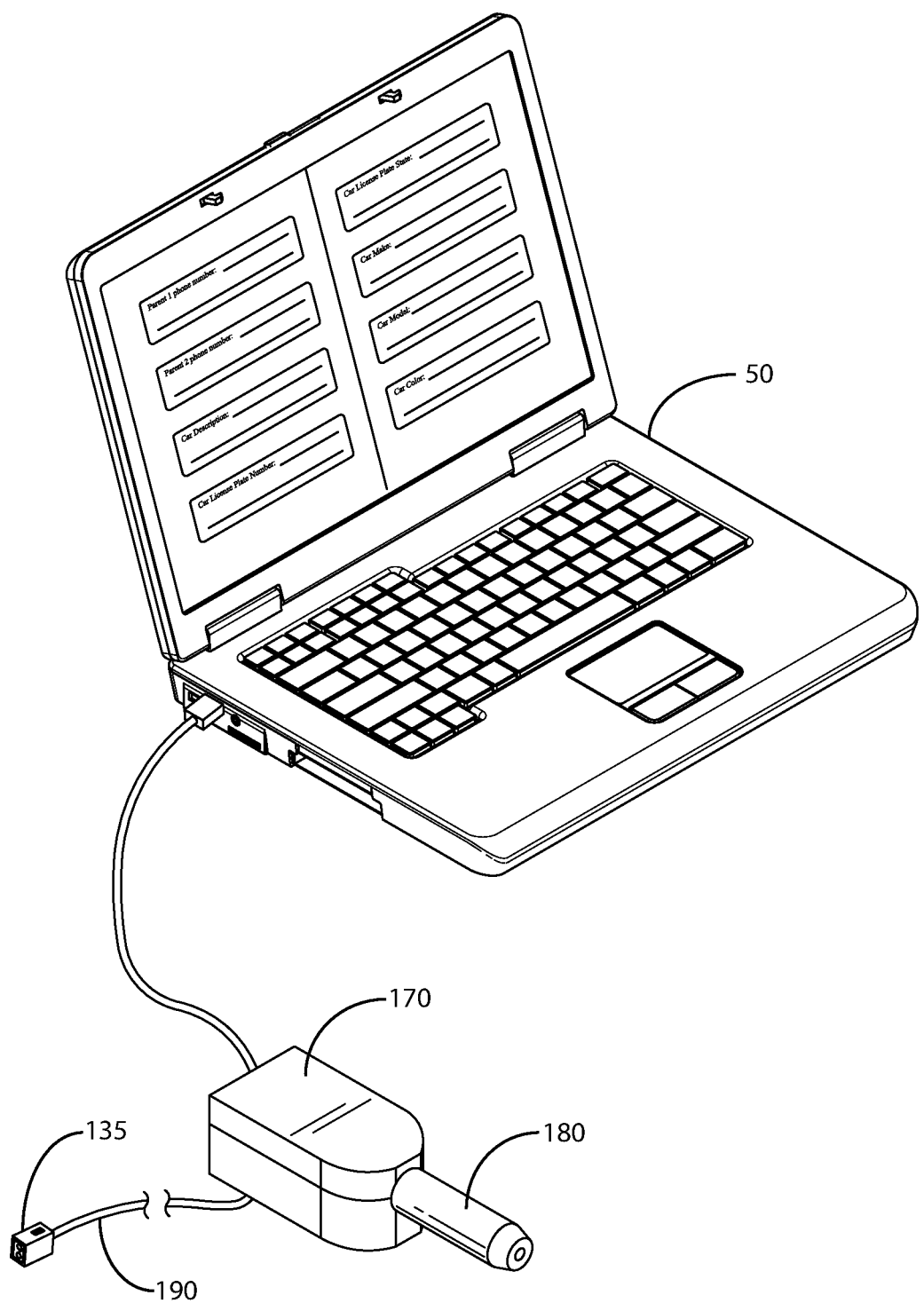
FIG. 5 is a perspective view of the invention as interfaced with an electronic device, such as a laptop computer.

The control circuit 60 is housed at least partially within an enclosure 170 (FIGS. 1, 3, and 5), and may include a cover 175. The battery recharging circuit 110 may include a cigarette lighter adapter 180 (FIG. 5) for interfacing with the electronic ignition system 21 of the vehicle 20 through a cigarette lighter socket 24, or other 12-volt DC socket, of the vehicle 20. The cigarette lighter adapter 180 may be formed as part of or connected with the enclosure 170, such that the control circuit is fully contained in the enclosure 170 and cigarette lighter adapter 180 combination, except for the weight sensor 130 that connects to the control circuit 60 through at least two conductors 190 (FIGS. 1 and 3), which preferably electrically connect with the control circuit 60 and the weight sensor 130 through mechanical electrical connector clips 135. Preferably the enclosure 170, the cover 175, and the cigarette lighter adapter 180 are made with a suitably strong, rigid injection molded plastic, or the like.

Figure 9:
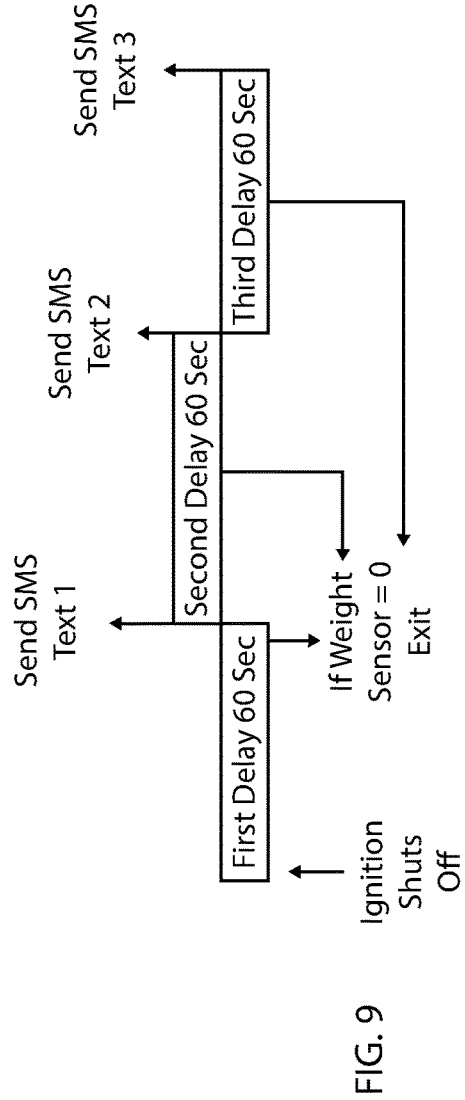
FIG. 9 is an example timing diagram showing the steps taken by the controller if the child is left in the car seat after an ignition system of the vehicle is turned off.

In use, if the child 18 remains in the car seat 40 beyond a first predetermined time $T_1$, such as 60 seconds, after the controller 70 senses with the battery recharging circuit 100 that the ignition state of the ignition system 21 has been set to the off state 23 (FIG. 9), the controller 70 then records into the memory 140 a current location 16, preferably in the form of geographic coordinates such as latitude and longitude, as reported by the location sensing circuit 110. The controller 70 then sends at least one message 200 through the network 15 with the network communication circuit 120, preferably to alert a parent 30 or emergency services 240.

Preferably the at least one message 200 sent by the controller 70 includes a first SMS text message 201 to a first mobile phone number 56, such as the mobile phone number 56 associated with the portable electronic device 55 of the parent 30, such that the parent 30 may quickly remember the child 18 and go back to the vehicle 20. In some embodiments both the first mobile phone number 56, a second phone number 57, or more may be simultaneously sent the first SMS text message 201. As an alternative to SMS text protocols, a voice message may be sent through a telephone network by the network communication circuit 120, although SMS messages 200 are the preferred method.

If after a second predetermined period of time $T_2$, such as another sixty seconds for example, the child 16 still remains in the car seat 40 with the vehicle ignition system 21 in the off state 23, the controller 70 preferably sends a second SMS text message to the second mobile phone number 57, so as to perhaps alert a second parent (not shown) as to the danger of the child 18 being left in the vehicle 20.

Finally, if after a last predetermined period of time $T_N$, the child 16 still remains in the car seat 40 with the vehicle ignition system 21 in the off state 23, the controller 70 preferably sends a third SMS text message 203 to the third mobile phone number 57, so as to perhaps alert emergency services 240 as to the danger of the child 18 being left in the vehicle 20. The third mobile phone number 57 may be also be a dispatch center, for example, set-up to receive such calls or messages 203 and, based on the location 16 of the vehicle 20 as reported in the message 203 contact the appropriate police department that has jurisdiction over that location 16, for example.

The first, second and third SMS text messages 201,202, 203 may all be the same message, or get progressively more detailed. For example, the first SMS text message 201 might read "Is your child still in your vehicle?" whereas the second or third SMS text message 202,203 might read "A child has been detected left in a WHT HOND CIVIC LIC #2GPA417 at lat/lon 36.05825, −115.045046."

Figure 6:
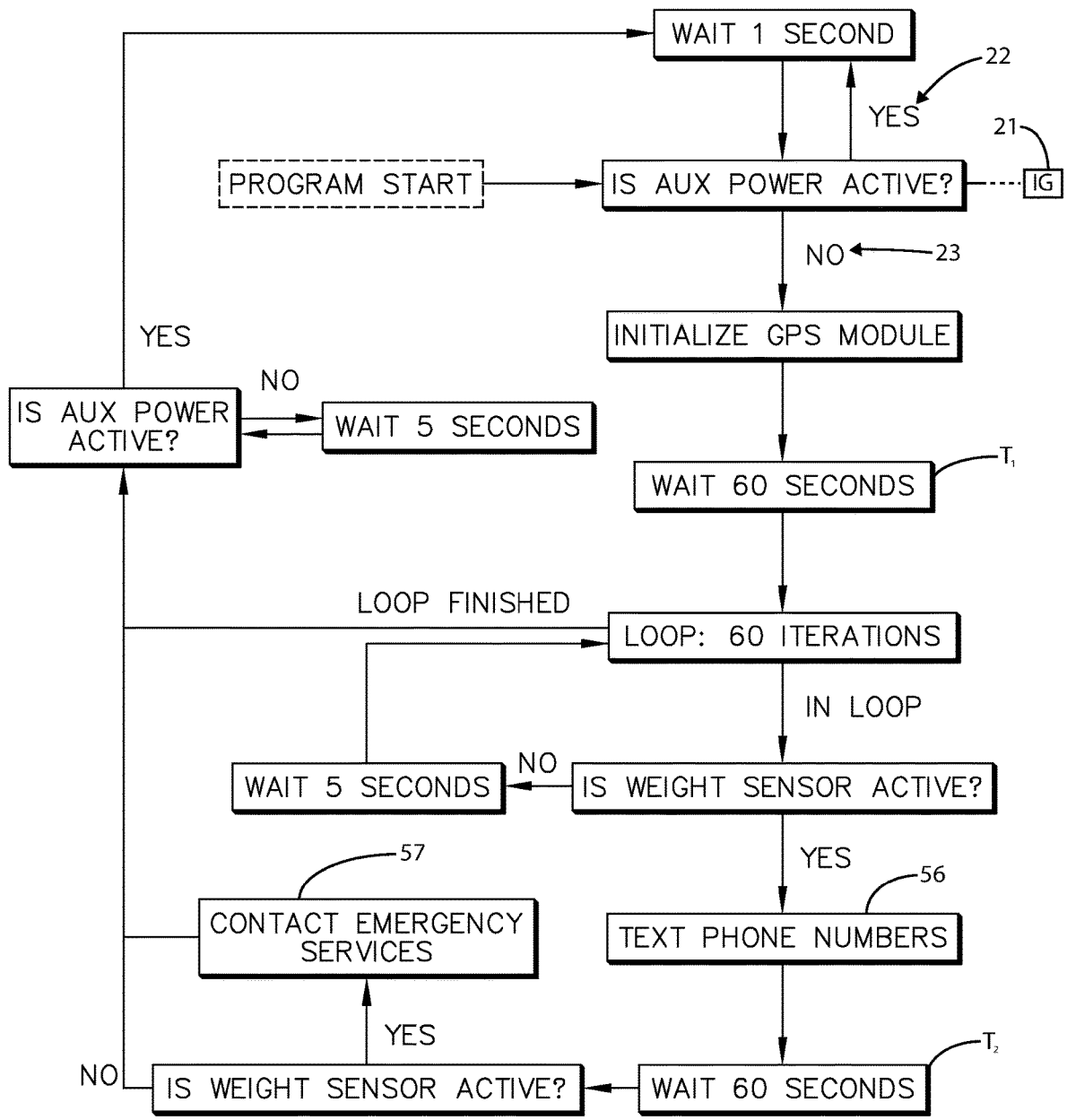
FIG. 6 is a flow diagram of steps taken by a controller of the control circuit.
Figure 7:
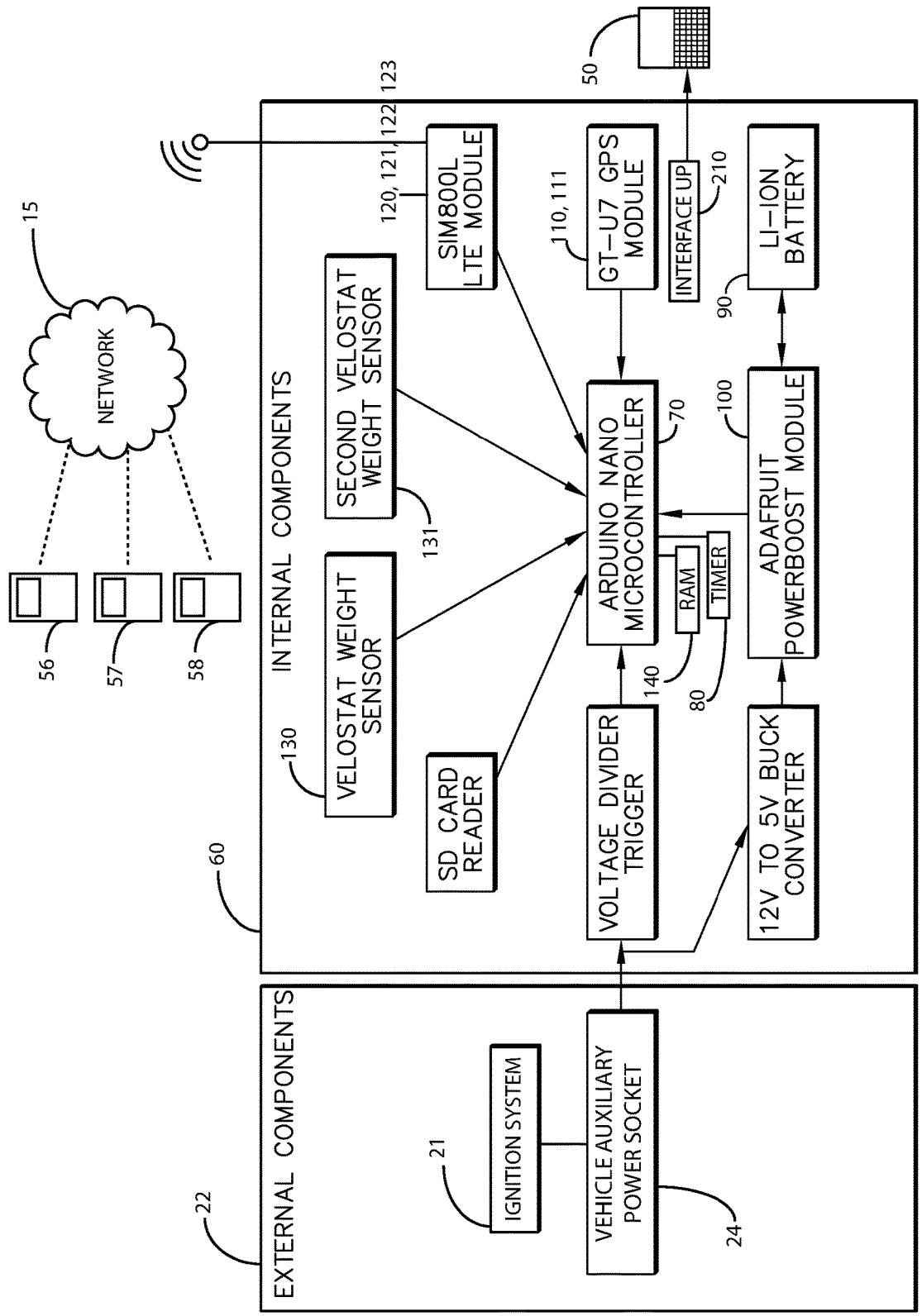
FIG. 7 is a system diagram of the invention.

In the embodiment illustrated in FIG. 6, only two phone numbers are sent the messages 200, a mobile phone 55 presumably belonging to the parent 30, and then finally to emergency services 240 or a dispatcher, for example. Clearly other combinations of messages 200 and numbers of different messages 200 may be utilized, preferably starting with phone numbers or authorities located closest to the location 16 of the vehicle 20. Preferably at least one of the messages 200 is adapted to include the current location 16 as stored in the memory 140.

Figure 8:
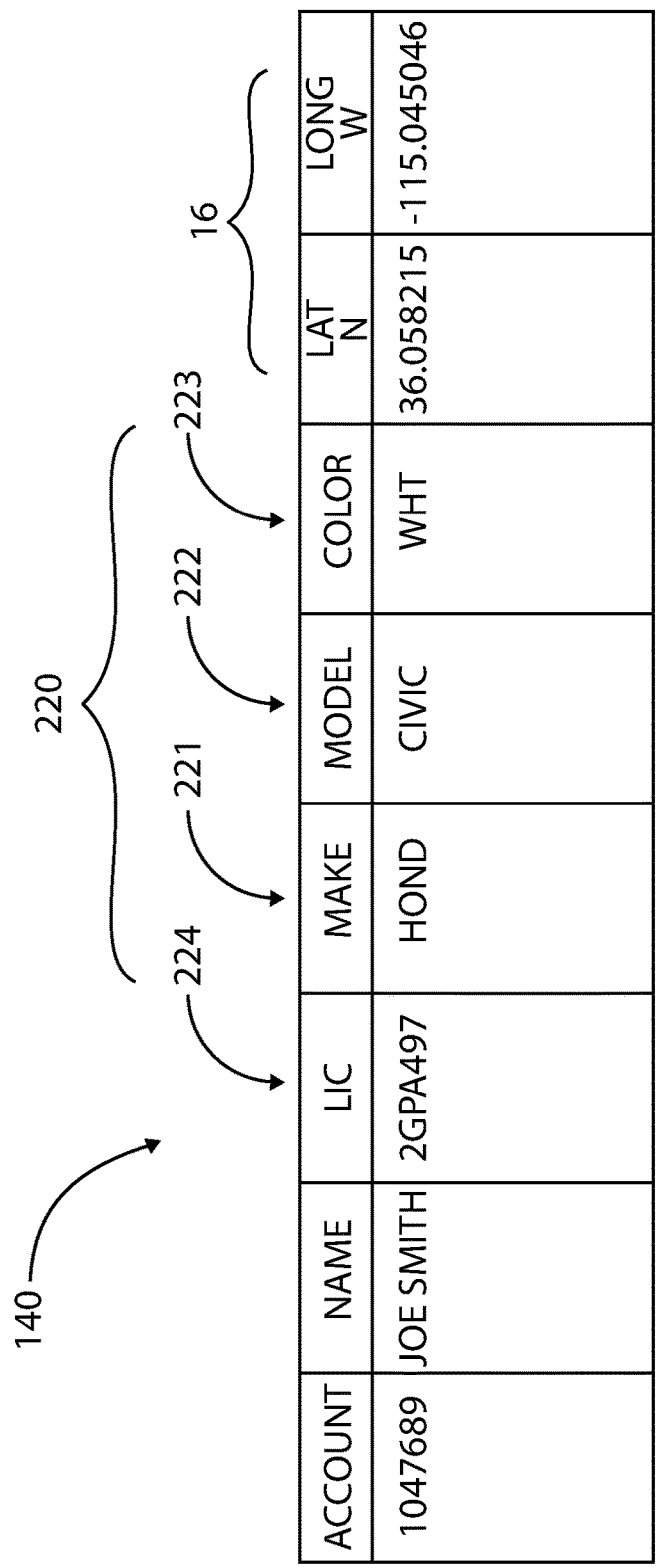
FIG. 8 is a diagram showing example contents of a memory of the invention.

In some embodiments the control circuit 60 further includes an interface circuit 210 adapted to connect with an electronic device 50, such as a computer with a USB port, for example. This interface circuit 210 may be included in the network communication circuit 120, for example as the Bluetooth communication protocol 123 that communicates with the electronic device 50 such as a mobile phone 55. As such, the alert system 10 allows the electronic device 50 to act as an input device for vehicle identification information 220 that is stored in the memory 140. Such vehicle identification information 220 may include at least a make 221 of the vehicle 20 (FIG. 8), a model 222 of the vehicle 20, a color 223 of the vehicle 20, and a license plate number 224 of the vehicle 20. With such vehicle information 220 included in the at least one message 200, emergency services personnel can quickly locate the correct vehicle 20 nearest the location 16 to take corrective action to free the child 18 from the vehicle 20.

In some embodiments the control circuit 60 is adapted to monitor the weight sensor 130, and an additional weight sensor 131, and potentially even more additional weight sensors 131, each weight sensor 130,131 associated with one of a multiple number of car seats 40 to accommodate and monitor more than one child 18.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An alert system for sending an alert to a network when a child is abandoned in a car seat fixed with a vehicle of the type having an electronic ignition system having an on state and an off state, the alert system comprising:
    a control circuit that includes a controller having a timer, a battery, a battery recharging circuit adapted to connect with the vehicle ignition system for power and for detecting the on/off state of the ignition system, a location sensing circuit, a network communication circuit, a weight sensor, and a memory, the battery adapted for recharging by the recharging circuit when the vehicle ignition system is in the on state, the memory adapted to retain a location from the location sensing circuit, the weight sensor disposed below the child when the child is seated in the car seat, the controller adapted to determine if the child is occupying the car seat based on data from the weight sensor; and
    an enclosure, the control circuit housed at least partially within the enclosure;
    whereby if the child remains in the car seat beyond a first predetermined time after the controller senses with the battery recharging circuit that the ignition state of the vehicle is off, the controller records a current location into the memory as reported by the location sensing circuit and sends at least one message through the network with the network communication circuit.

2. The alert system of claim 1 wherein the battery recharging circuit includes a cigarette lighter adapter for interfacing with the vehicles electronic ignition system through a cigarette lighter type socket of the vehicle.

3. The alert system of claim 2 wherein the cigarette lighter adapter includes the enclosure, the alert system further including at least two conductors for connecting the control circuit to the weight sensor.

4. The alert system of claim 1 wherein the location sensing circuit includes a GPS location sensing circuit.

5. The alert system of claim 1 wherein the network communication circuit includes an SMS network communication circuit.

6. The alert system of claim 5 wherein the at least one message sent by the controller includes a first SMS text message to a first mobile phone number.

7. The alert system of claim 6 wherein the at least one message sent by the controller includes a second SMS text message to a second mobile phone number.

8. The alert system of claim 7 wherein the controller sends the second SMS text message to the second mobile phone number after a second predetermined period of time.

9. The alert system of claim 7 wherein the at least one message sent by the controller includes a third SMS text message to a third mobile phone number.

10. The alert system of claim 9 wherein the controller sends the third SMS text message to the third mobile phone number after a second predetermined period of time.

11. The alert system of claim 6 wherein the first SMS text message includes the current location as stored in the memory.

12. The alert system of claim 11 wherein the control circuit further includes an interface circuit adapted to connect with an electronic device, and wherein the memory is adapted to retain vehicle identification information uploaded to the memory from the electronic device, and wherein the first SMS text message further includes the vehicle identification information.

13. The alert system of claim 12 wherein the vehicle identification information includes at least a make of the vehicle, a model of the vehicle, a color of the vehicle, and a license plate number of the vehicle.

14. The alert system of claim 1 wherein the network communication circuit includes a GPRS network communication circuit.

15. The alert system of claim 1 wherein the network communication circuit includes a Bluetooth communication protocol adapted for establishing a direct connection with a portable electronic device of a parent, for receiving the at least one message from the controller.

16. The alert system of claim 15 wherein the control circuit further includes an interface circuit adapted to connect with the portable electronic device, and wherein the memory is adapted to retain vehicle identification information uploaded to the memory from the portable electronic device, and wherein the at least one message includes the vehicle identification information.

17. An alert system for sending an alert to a network when a child is abandoned in one of a plurality of car seats fixed with a vehicle of the type having an electronic ignition system having an on state and an off state, the alert system comprising:

a control circuit that includes a controller having a timer, a battery, a battery recharging circuit adapted to connect with the vehicle ignition system for power and for detecting the on/off state of the ignition system, a location sensing circuit, a network communication circuit, a weight sensor for each car seat, and a memory, the battery adapted for recharging by the recharging circuit when the vehicle ignition system is in the on state, the memory adapted to retain a location from the location sensing circuit, each weight sensor disposed one of the car seats below the child when the child is seated therein, the controller adapted to determine if a child is occupying any of the car seats based on data from the weight sensors; and an enclosure, the control circuit housed at least partially within the enclosure;

whereby if the child remains in one of the car seats beyond a first predetermined time after the controller senses with the battery recharging circuit that the ignition state of the vehicle is off, the controller records into the memory a current location as reported by the location sensing circuit, and sends at least one message through the network with the network communication circuit.

18. The alert system of claim 17 wherein the battery recharging circuit includes a cigarette lighter adapter for interfacing with the vehicles electronic ignition system through a cigarette lighter socket of the vehicle.

19. The alert system of claim 18 wherein the cigarette lighter adapter includes the enclosure, the alert system further including at least two conductors for connecting the control circuit to each weight sensor.

20. The alert system of claim 17 wherein the control circuit further includes a network communication circuit that includes a Bluetooth communication protocol adapted for establishing a direct connection with a portable electronic device of a parent, for receiving the at least one message from the controller, and an interface circuit adapted to connect with the portable electronic device, wherein the memory is adapted to retain vehicle identification information uploaded to the memory from the portable electronic device, and wherein the at least one message includes the vehicle identification information.

* * * * *